United States Patent [19]

Fujita

[11] Patent Number: 5,381,311
[45] Date of Patent: Jan. 10, 1995

[54] CHEMILUMINESCENCE DEVICE

[75] Inventor: Masahiko Fujita, Munakata, Japan

[73] Assignee: Nihon Kagaku Hakkou K.K., Kukuoka, Japan

[21] Appl. No.: 91,924

[22] Filed: Jul. 16, 1993

[51] Int. Cl.⁶ .................................................. F21K 2/06
[52] U.S. Cl. ........................................ 362/34; 362/84; 206/219
[58] Field of Search .................... 362/34, 84; 206/219; 252/700

[56] References Cited

U.S. PATENT DOCUMENTS

| | | | |
|---|---|---|---|
| 3,578,962 | 5/1971 | Gerber | 362/34 |
| 3,819,925 | 6/1974 | Richter et al. | 362/34 |
| 4,379,320 | 4/1983 | Mohan et al. | 362/34 |

Primary Examiner—Ira S. Lazarus
Assistant Examiner—L. Heyman
Attorney, Agent, or Firm—Armstrong, Westerman, Hattori, McLeland & Naughton

[57] ABSTRACT

A chemiluminescence device comprising a first sealed container containing first substance therein which emits light chemically when it mixes with second substance, a hollow protrudent portion protruded from the first sealed container, and second sealed container containing the second substance therein and arranged in the first sealed container. The shape of the hollow protrudent portion can be changed by external force. At least a part of the second sealed container is breakable and arranged in the hollow protrudent portion. The part of the second sealed container can be broken by changing the shape of the hollow protrudent portion.

22 Claims, 5 Drawing Sheets

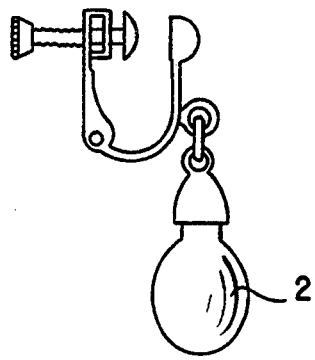
FIG.4
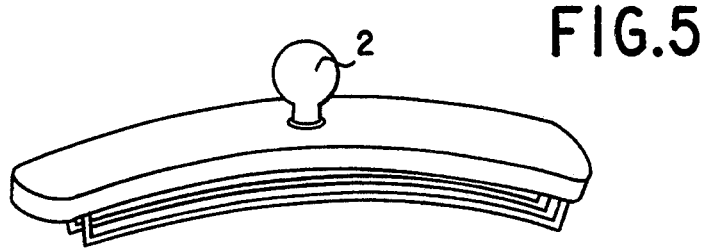
FIG.5
FIG.6
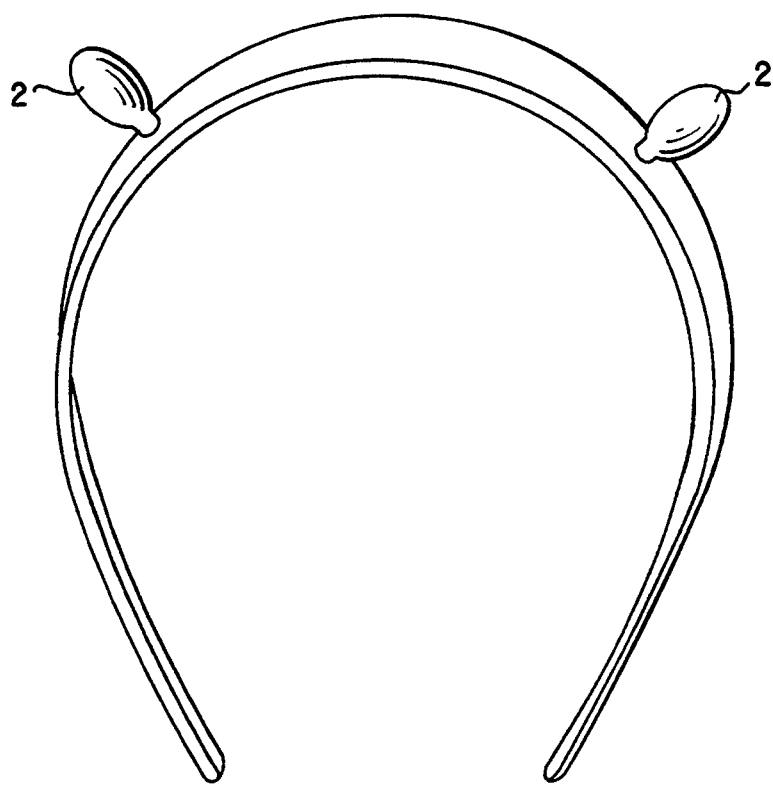

CHEMILUMINESCENCE DEVICE

BACKGROUND OF THE INVENTION

1. Field of the Invention

The present invention relates to a chemiluminescence device which is utilized for signs, fishing tackles, lighting equipment, accessories, and the like.

2. Description of the Related Art

FIG. 12 illustrates a conventional chemiluminescence device for attractions and accessories.

Referring to FIG. 12, reference numeral 51 designates a transparent cylindrical sealed container. A sealed tube 52 made of glass is arranged in the sealed container 51. First liquid A which emits light chemically when it mixes with second liquid B is charged in the sealed container 51 and the second liquid B is contained in the sealed tube 52. When the sealed tube 52 is broken by bending the sealed container 51 and then the first liquid A mixes with the second liquid B, light is emitted from the chemiluminescence device.

Incidentally, there is a demand to prolong an emitting period during which the chemiluminescence device emits light and to increase luminous intensity. To prolong the emitting period and to increase the luminous intensity, an amount of either the liquid A or the liquid B must be increased. In the chemiluminescence device shown in FIG. 12, however, when either the diameter or the length of the sealed container 51 is increased to increase the volume thereof, the following problem arises. Namely, a problem arises in that the sealed container 51 cannot be bent when the diameter of the sealed container 51 is increased. Also, when the length of the sealed container 51 is increased, the length of the chemiluminescence device cannot be determined to be a suitable length for use.

SUMMARY OF THE INVENTION

An object of the present invention is to provide a chemiluminescence device capable of prolonging the emitting period, increasing the luminous intensity, and also with solving the above problems.

According to the present invention, a chemiluminescence device is provided, comprising: a first sealed container containing first substance therein which emits light chemically when it mixes with a second substance, light being able to pass through the first sealed container; a hollow protrudent portion protruded from the first sealed container, a shape of the hollow protrudent portion being able to be changed by external force; and a second sealed container containing the second substance therein and arranged in the first sealed container, at least a part of the second sealed container being breakable and arranged in the hollow protrudent portion, the part of the second sealed container being able to be broken by changing the shape of the hollow protrudent portion.

The present invention may be more fully understood from the description of preferred embodiments of the invention set forth below, together with the accompanying drawings.

BRIEF DESCRIPTION OF THE DRAWINGS

In the drawings:

FIG. 4 is an elevational view of the fourth embodiment of a present invention;

FIG. 5 is a perspective view of the fifth embodiment of a present invention;

FIG. 6 is a perspective view of the sixth embodiment of a present invention;

DESCRIPTION OF THE PREFERRED EMBODIMENTS

Figure 1:
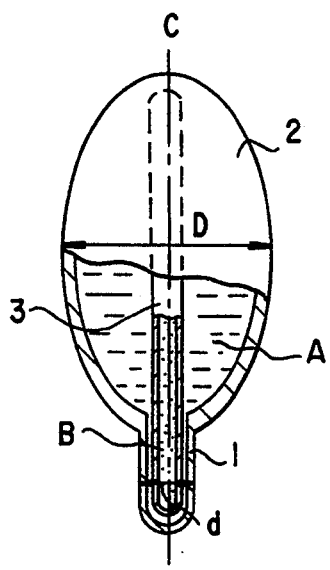
FIG. 1 is a partly cross-sectional elevational view of the first embodiment of a chemiluminescence device of the present invention.

FIG. 1 illustrates a first embodiment of the present invention. Referring to FIG. 1, reference numeral 2 designates an oval sealed container. The sealed container 2 is transparent and made from polyolefin resin, for example, polyethylene or polypropylene. Note, the sealed container 2 may be semitransparent. A protrudent portion 1 protruded from the sealed container 2 is formed integrally therewith. The protrudent portion 1 is substantially cylindrical and the center line C of the protrudent portion 1 is approximately coincident with the center line C of the sealed container 2. The diameter, the length, the thickness, and material of the protrudent portion 1 are determined so that the shape of the protrudent portion 1 can be changed by hand. In this embodiment, the protrudent portion 1 is made from the same material as the sealed container 2. The maximum diameter D of the sealed container 2 is approximately two times as large as the diameter D of the protrudent portion 1. A sealed tube 3 is arranged in the sealed container 2. The sealed tube 3 is cylindrical and made from glass. The diameter of the sealed tube 3 is slightly smaller than the inner diameter of the protrudent portion 1. One end portion of the sealed tube 3 is arranged in the protrudent portion 1 and the other end portion thereof extends near to the wall of the sealed container 2. The center line C of the sealed tube 3 is substantially coincident with the center line C of the sealed container 2.

First liquid A is contained in the sealed container 2 and second liquid B is contained in the sealed tube 3. When the first liquid A mixes with the second liquid B, light is emitted chemically. The first liquid A comprises, for example, oxalic ester, fluorescent substance, and dibutyl phthalate, and the second liquid B comprises, for example, hydrogen peroxide, sodium salicylate, and dimethyl phthalate. In the conventional chemiluminescence device, the volumetric ratio of the first liquid A to the second liquid B is 10:2~3. In this embodiment, since the volume of the sealed container 2 can be considerably increased, a large amount of the first liquid A can be contained in the sealed container 2. Therefore, the volumetric ratio of the first liquid A to the second liquid B becomes 10~20:1. Accordingly, in order to emit light efficiently under this volumetric ratio, molar concentration of component in the first liquid A and the second liquid B is adjusted.

When the sealed tube 3 is broken by bending the protrudent portion 1 by hand and then the first liquid A mixes with the second liquid B, light is emitted chemically from the chemiluminescence device.

In this embodiment, since a large amount of the first liquid A can be contained in the sealed container 2, the emitting period can be prolonged and the luminous intensity can be increased. Also, the protrudent portion 1 can be easily bent and the length of the chemiluminescence device can be shortened.

Further, since an area of lighting surface can be increased by increasing the volume of the sealed container 2, light can be found from farther away.

Further, since light is emitted approximately equal toward the entire direction, light can be easily found from the entire direction.

Furthermore, although carbon dioxide is generated during the chemical reaction by which light is emitted, since the sealed container 2 is oval, it is not easily deformed by gas pressure.

Furthermore, the chemiluminescence device can be easily attached to another member by the protrudent portion 1.

Note, a hole may be provided at the protrudent portion 1. In this case, by passing a thread through the hole, the chemiluminescence device can be easily worn as an accessory.

Further, the first liquid A may be contained in the sealed tube 3 and the second liquid B may be contained in the sealed container 2.

Furthermore, organic fluorescent substance may be added to the material which constitutes the sealed container 2 so that wavelength of light emitted by the chemical reaction is lengthened. For example, when 1-chloro-9,10-bis(phenylethynyl)-anthracene is used as the first liquid in the sealed container 2, the wavelength of light is 520 nm. In this case, when organic fluorescent, for example, 1,4dichloro-5,12-bis(phenylethynyl)-naphthacen(DCBPEN) or aryloxy substituted 3,4,9,10-perylene tetracarboxy diimido, is added to the material which constitutes the sealed container 2, the wavelength of light is lengthened to 600–615 nm. Therefore, the color of light emitted by the chemical reaction can be changed easily.

Figure 12:
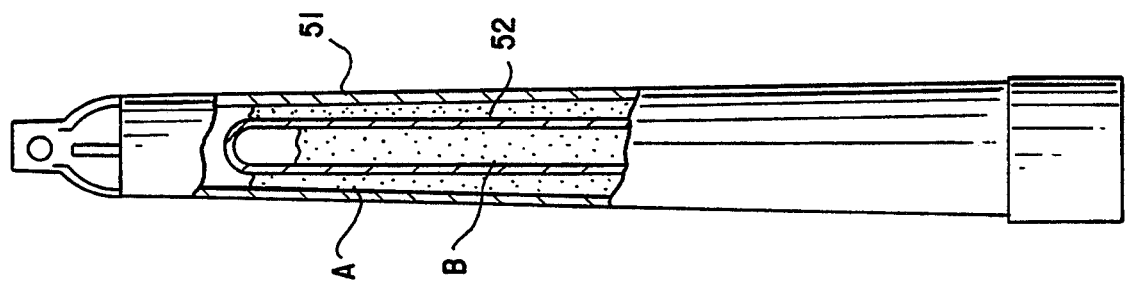
FIG. 12 is a partly cross-sectional elevational view of the conventional chemiluminescence device.

The following is an experimental result for comparing the first embodiment of the present invention and the conventional chemiluminescence device (see FIG. 12). The Table 1 shows the relationship between luminous intensity and elapsed time.

TABLE 1

|  | 0.5 Hr | 1.0 Hr | 2.0 Hr | 3.0 Hr | 4.0 Hr | 5.0 Hr |
|---|---|---|---|---|---|---|
| FIRST EMBODIMENT | 20.2 LUX | 14.9 LUX | 6.5 LUX | 3.8 LUX | 2.5 LUX | 1.7 LUX |
| CONVENTIONAL DEVICE | 13.5 LUX | 8.3 LUX | 3.4 LUX | 2.0 LUX | 1.4 LUX | 1.1 LUX |

| EXPERIMENTAL CONDITIONS | | |
|---|---|---|
|  | FIRST EMBODIMENT (FIG. 1) | CONVENTIONAL DEVICE (FIG. 12) |
| SEALED CONTAINER 2 | | |
| LENGTH (mm) | 30 | 30 |

TABLE 1-continued

| DIAMETER (mm) | 4.5 (protrudent portion) 8.0 (maximum portion) | 4.5 |
|---|---|---|
| FIRST LIQUID (cc) | A 0.376 | A 0.128 |
| SECOND LIQUID (cc) | B-1 0.051 | B-2 0.032 |
| FIRST LIQUID A | | |
| BIS(6-carbopentoxy-2,4,5-trichlorophenyl)Oxalate | 0.16M/L | |
| 1-CHLORO-9,10-BIS-(PHENYLETHYNYL)-ANTHRACENE DIBUTYL PHTHALATE solvent | 0.007M/L | |
| SECOND LIQUID B-1 | | |
| HYDROGEN PEROXIDE | 1.6M/L | |
| SODIUM SALICYLATE | 0.0028M/L | |
| DIMETHYLPHTHALATE | 80 percent (volume) | |
| t-butanol | 20 percent (volume) | |
| SECOND LIQUID B-2 | | |
| HYDROGEN PEROXIDE | 1.6M/L | |
| SODIUM SALICYLATE | 0.00175M/L | |
| DIMETHYLPHTHALATE | 80 percent (volume) | |
| t-butanol | 20 percent (volume) | |
| AMBIENT TEMPERATURE | 23° C. | |
| MEASURING INSTRUMENT | J16DIGITAL PHOTOMETER (made by TEKTRONIX) | |

Figure 2:
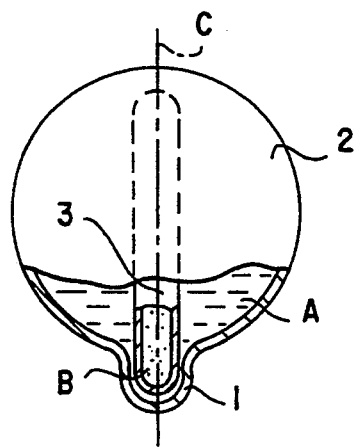
FIG. 2 is a partly cross-sectional elevational view of the second embodiment of a chemiluminescence device of a present invention.

The second embodiment of the present invention is shown in FIG. 2, wherein the sealed container 2 is spherical. Since the length of the protrudent portion 1 is shorter than that in the first embodiment, the protrudent portion 1 in the second embodiment cannot be bent. Accordingly, the sealed tube 3 is broken by adding impulsive force to the protrudent portion 1.

In this embodiment, light is emitted more equally toward the entire direction and sealed container 2 is stronger against gas pressure generated therein.

Figure 3:
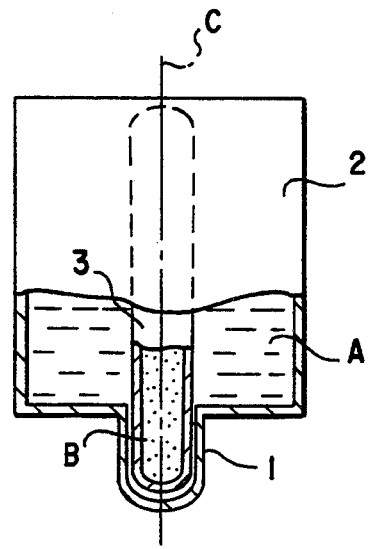
FIG. 3 is a partly cross-sectional elevational view of the third embodiment of a chemiluminescence device of a present invention.

The third embodiment of the present invention is shown in FIG. 3, wherein the sealed container 2 is cylindrical.

In FIG. 4, the fourth embodiment that the chemiluminescence device of the first embodiment is utilized for an earring is illustrated.

In FIG. 5, the fifth embodiment that the chemiluminescence device of the second embodiment is utilized for a barrette is illustrated.

In FIG. 6, the sixth embodiment that the chemiluminescence device of the first embodiment is utilized for a hair band is illustrated.

Figure 7:
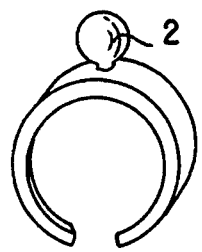
FIG. 7 is a perspective view of the seventh embodiment of a present invention.

In FIG. 7, the seventh embodiment that the chemiluminescence device of the second embodiment is utilized for a ring is illustrated.

Figure 8:
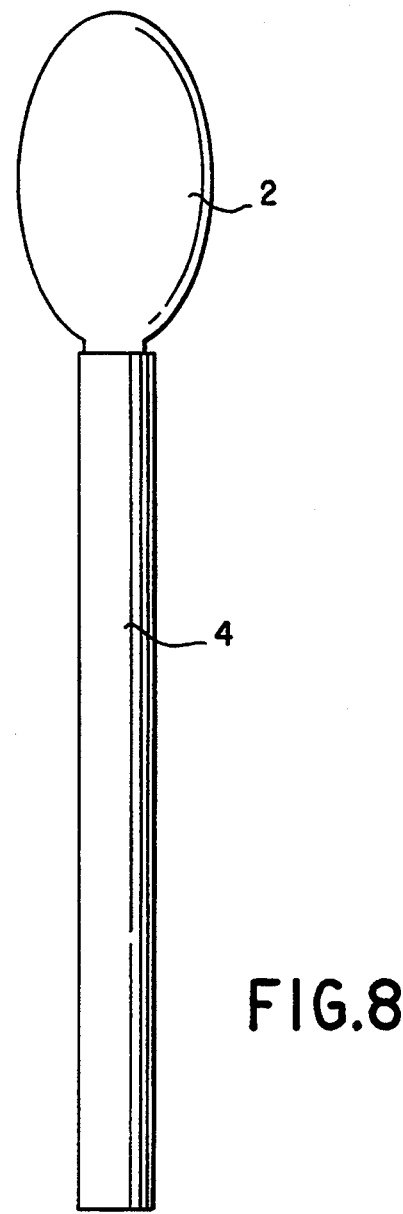
FIG. 8 is an elevational view of the eighth embodiment of a present invention.

In FIG. 8, the eighth embodiment that the chemiluminescence device of the first embodiment is connected to a grip 4 at the protrudent portion is illustrated.

Figure 9:
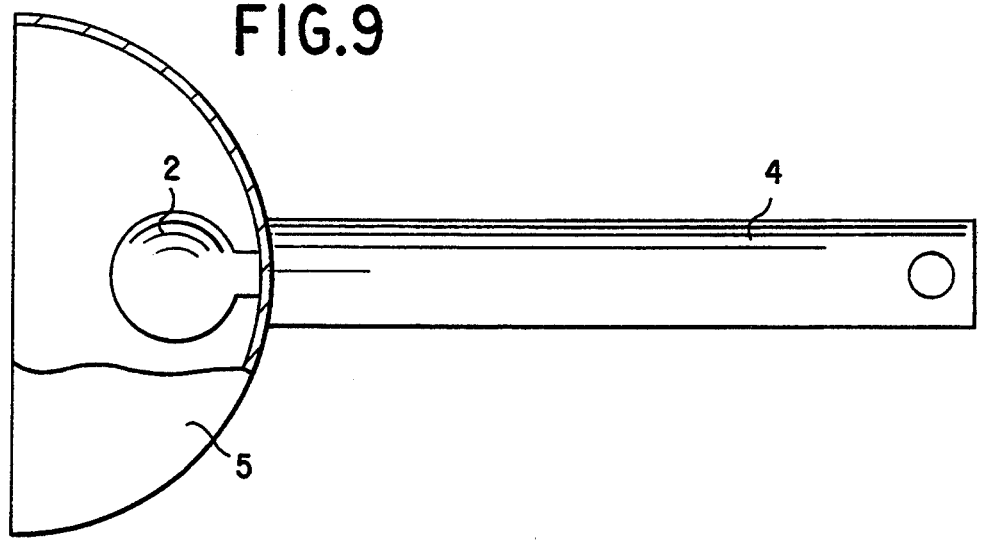
FIG. 9 is a partly cross-sectional elevational view of the ninth embodiment of a present invention.

In FIG. 9, the ninth embodiment that the chemiluminescence device of the second embodiment is used as a light is illustrated. In this embodiment, the chemiluminescence device is arranged at the center of a curved reflector 5 which is attached to the grip 4.

Figure 10:
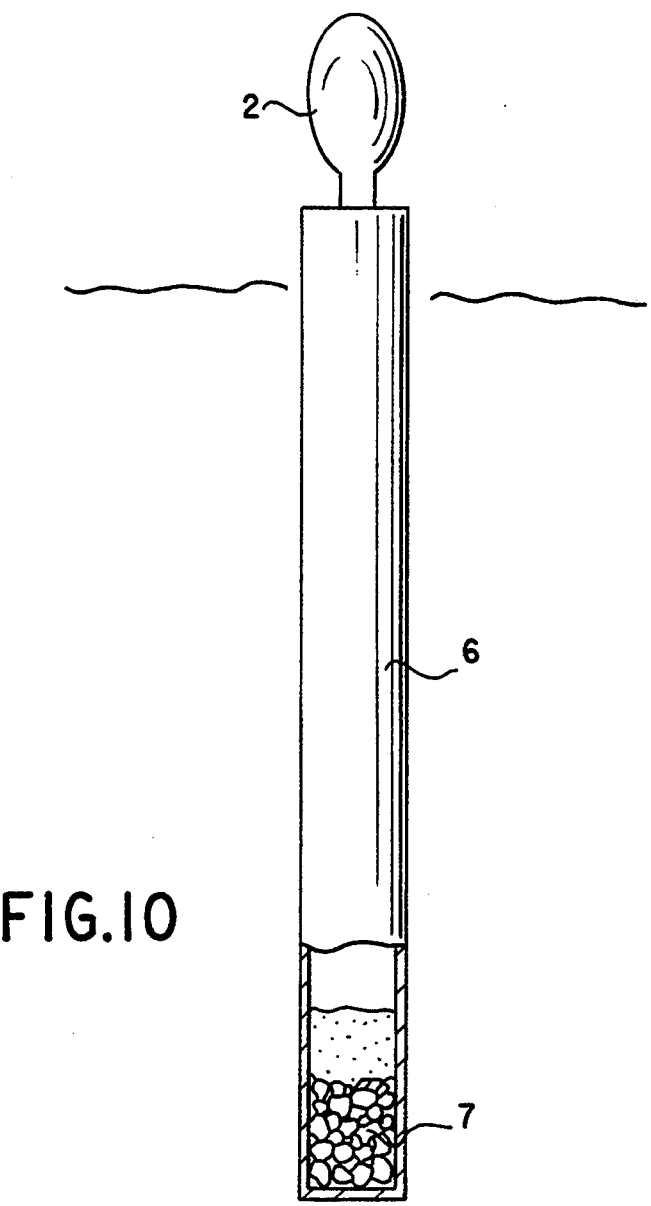
FIG. 10 is a partly cross-sectional elevational view of the tenth embodiment of a present invention.

In FIG. 10, the tenth embodiment that the chemiluminescence device of the first embodiment is utilized for is a signal on maritime accident. In this embodiment, the chemiluminescence device is attached to one end of a tube 6 and a weight 7 is arranged in the tube 6 at the other end of the tube 6. The tube 6 is made from plastic or paper. Note, the tube may be made from material which is dissolved by seawater in order that the signal sinks when certain time elapses.

Figure 11:
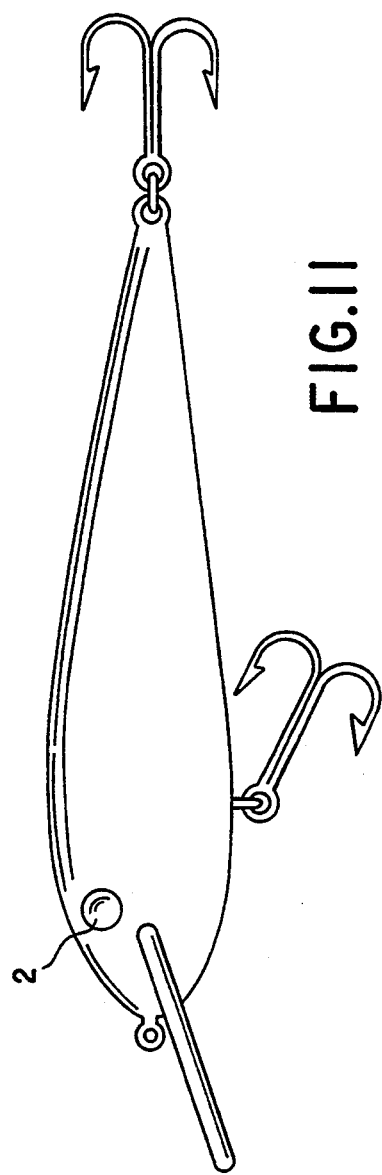
FIG. 11 is an elevational view of the eleventh embodiment of a present invention.

In FIG. 11, the eleventh embodiment that the chemiluminescence device is utilized for is a lure.

Although the invention has been described with reference to specific embodiments chosen for purposes of illustration, it should be apparent that numerous modifications can be made without departing from the basic concept and scope of the invention.

What is claimed is:

1. A chemiluminescence device, comprising:
   a first sealed container containing first substance therein which emits light chemically when it mixes with second substance, light being able to pass through said first sealed container, said first sealed container having one of an oval and a circular cross-section;
   a hollow protrudent portion protruded from said first sealed container, a shape of said hollow protrudent portion being able to be changed by external force; and
   a second sealed container containing said second substance therein and arranged in said first sealed container, at least a part of said second sealed container being breakable and arranged in said hollow protrudent portion, said part of said second sealed container being able to be broken by changing said shape of said hollow protrudent portion, the ratio of first substance to second substance being from 10-20:1.

2. A chemiluminescence device according to claim 1, wherein an entire surface of said first sealed container is formed by a smoothly curved surface.

3. A chemiluminescence device according to claim 2, wherein the cross-section of said first sealed container is oval.

4. A chemiluminescence device according to claim 3, wherein said second sealed container has a center line and said center line is approximately coincident with a center line of said first sealed container.

5. A chemiluminescence device according to claim 2, wherein said first sealed container is spherical.

6. A chemiluminescence device according to claim 5, wherein said second sealed container has a center line and said center line is approximately coincident with a center line of said first sealed container.

7. A chemiluminescence device according to claim 1, wherein said first sealed container is cylindrical.

8. A chemiluminescence device according to claim 7, wherein said second sealed container has a center line and said center line is approximately coincident with a center line of said first sealed container.

9. A chemiluminescence device according to claim 1, wherein said first sealed container is transparent or semitransparent.

10. A chemiluminescence device according to claim 1, wherein said first sealed container is made from polyolefin resin.

11. A chemiluminescence device according to claim 1, wherein sizes and material of said hollow protrudent portion are determined so that said shape of said hollow protrudent portion can be changed by hand.

12. A chemiluminescence device according to claim 1, wherein sizes and material of said hollow protrudent portion are determined so that said shape of said hollow protrudent portion can be changed by adding impulsive force.

13. A chemiluminescence device according to claim 1, wherein said hollow protrudent portion is formed integrally with said first sealed container.

14. A chemiluminescence device according to claim 1, wherein said first sealed container has a center line, said hollow protrudent portion has a center line, and said two center lines are coincident.

15. A chemiluminescence device according to claim 1, wherein said second sealed container is tubular.

16. A chemiluminescence device according to claim 15, wherein said second sealed container is cylindrical.

17. A chemiluminescence device according to claim 1, wherein said second sealed container is made from glass.

18. A chemiluminescence device according to claim 1, wherein said first substance and said second substance are liquid.

19. A chemiluminescence device according to claim 18, wherein said first substance comprises oxalic ester, fluorescent substance, and dibutyl phthalate, and said second substance comprises hydrogen peroxide, sodium salicylate, and dimethyl phthalate.

20. A chemiluminescence device according to claim 18, wherein said first substance comprises hydrogen peroxide, sodium salicylate, and dimethyl phthalate, and said second substance comprises oxalic ester, fluorescent substance, and dibutyl phthalate.

21. A chemiluminescence device according to claim 1, wherein fluorescent substance is added to material which constitutes said first sealed container so that the wavelength of light emitted chemically is lengthened.

22. A chemiluminescence device according to claim 1, wherein a maximum diameter of the first sealed container is approximately two times as large as a diameter of the protrudent portion.

* * * * *